Nov. 20, 1962 E. JONES 3,064,819
REFRIGERANT DRIER
Filed Jan. 19, 1959 2 Sheets-Sheet 1
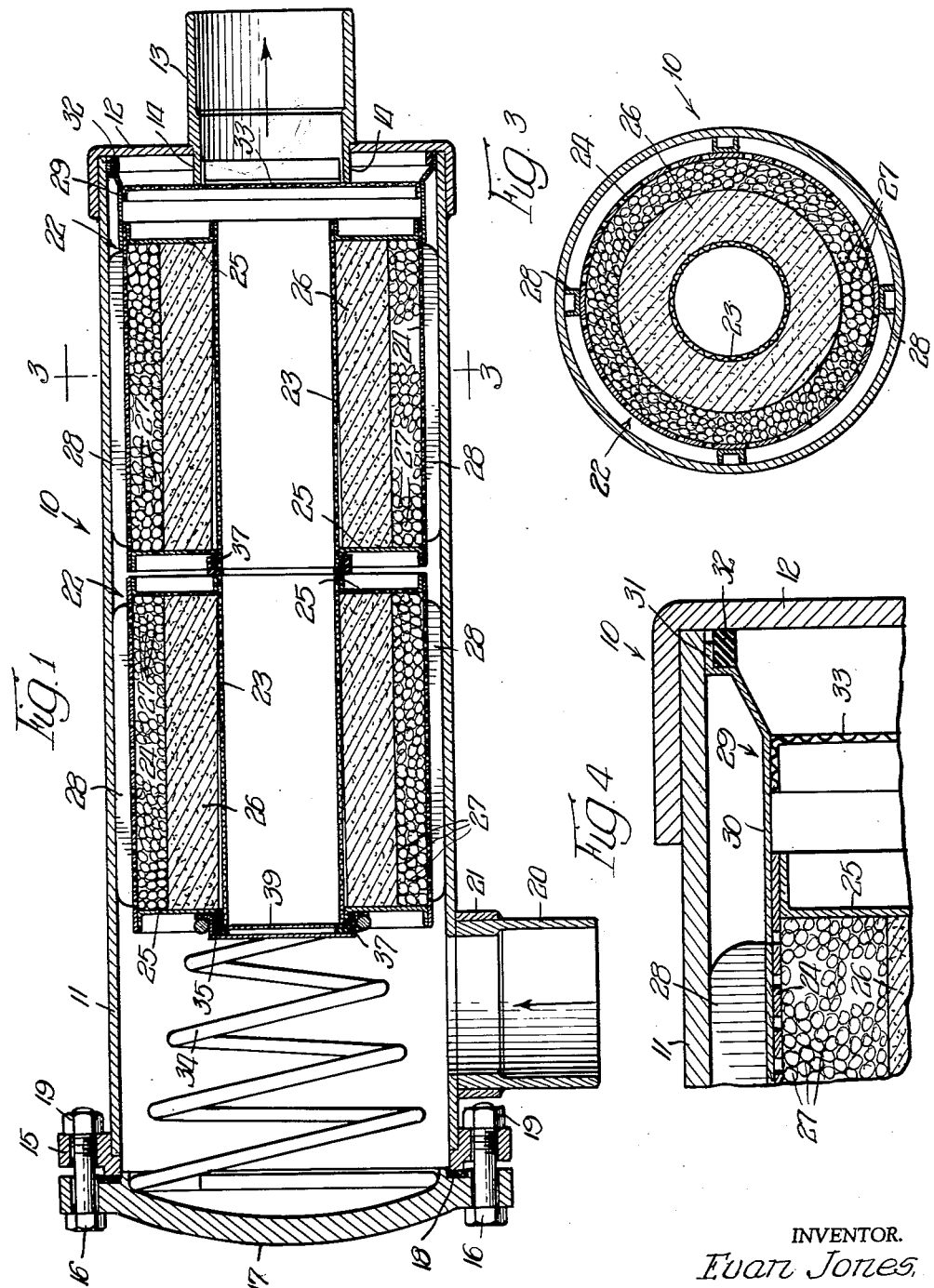
INVENTOR.
Evan Jones,
BY
Cromwell, Greist & Warden
Attys Nov. 20, 1962
E. JONES
3,064,819
REFRIGERANT DRIER
Filed Jan. 19, 1959
2 Sheets-Sheet 2
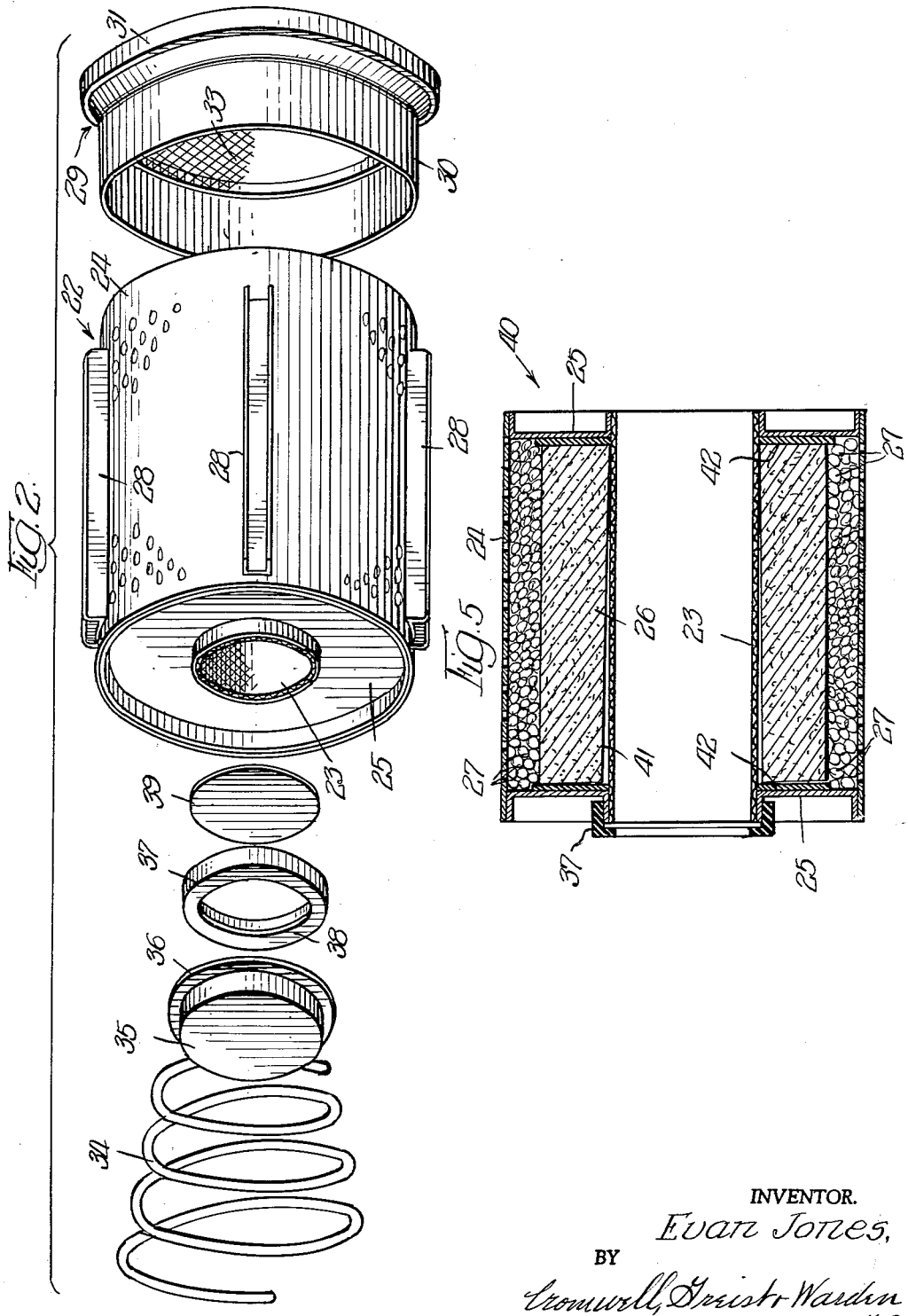
INVENTOR.
Evan Jones,
BY
Cromwell, Greist & Warden
Attys United States Patent Office 3,064,819
Patented Nov. 20, 1962

3,064,819
REFRIGERANT DRIER
Evan Jones, Evanston, Ill., assignor to Henry Valve Company, Melrose Park, Ill., a corporation of Illinois
Filed Jan. 19, 1959, Ser. No. 787,592
5 Claims. (Cl. 210—266)

The present invention is directed to a new and improved refrigerant drier assembly and drier cartridge therefor.

In larger refrigeration systems it is essential to maintain moisture in the refrigerant at a predetermined minimum in order to prevent corrosion and even possibly water freeze-up in portions of the system resulting in either costly damage or interruption of operation to an undesirable extent. Driers of the type commonly used include tubular housings provided with opposite end fittings serving as inlet and outlet means for mounting of the housing in a refrigerant line. Normally, the inlet fitting is formed in the shell of the housing to one side of one end thereof with this end being provided with a removable cover plate to permit replacement of drier cartridges received in the housing. The cartridges are formed from desiccant material and in most instances includes an outer tubular member enclosing the desiccant material with the ends of the cartridge being perforated for "straight through" refrigerant flow through the cartridge in contact with the desiccant material.

In increasing the number of drier cartridges of the type described in a drier assembly, an appreciable increase in pressure drop occurs. Consequently, the number of cartridges used will be limited by the extent of pressure drop increase accompanying such use. The problem of pressure drop in this type of "straight through" flow is accentuated by the problem of clogging of the foremost cartridge. In other words, the leading cartridge will function as a filter more so than the subsequent cartridges and a greater accumulation of foreign material will occur in the leading cartridge. If the filtering function were more uniformly distributed, the pressure drop build-up would not be as immediate.

Certain of the rather widely used refrigerant drier assemblies require careful and time consuming maintenance. The drier cartridges must be replaced from time to time in order to re-establish moisture removal efficiency. With cartridges being placed in end-to-end relation, suitable means must be used to align the cartridge within the housing as well as space and seal the same relative to one another. Separate axially directed rods and spacers forming a part of the permanent portion of the drier assembly are rather widely used and during replacement, it is necessary for these rods and spacers to be removed from the used cartridges and threaded through a series of new cartridges with suitable attachment and adjustment occurring. This procedure is time consuming and detrimental to the efficiency of the drier cartridges as, during this adjustment and alignment procedure, the drier cartridges are removed from their moisture-proof containers and subjected to atmospheric moisture. A measurable loss in drier efficiency and capacity occurs from the absorption of atmospheric moisture. Furthermore, the person carrying out recharging must be specially trained for this purpose in view of its complication. Any appreciable leakage occurring between aligned cartridges may prove extremely detrimental to the refrigerant system.

It is an object of the present invention to provide a new and improved refrigerant drier incorporating therein improvements in operational aspects of pressure drop and cartridge charging.

A further object is to provide a new and improved cartridge-type drier assembly incorporating therein a new and improved drier cartridge, the improved features of the assembly and cartridge providing for minimized pressure drop, fast and efficient charging, cartridge self-spacing, cartridge self-aligning and cartridge self-sealing.

Still a further object of the present invention is to provide a new and improved drier cartridge combining therein filter-drying action of improved efficiency, the cartridge being of uncomplicated design and capable of relatively low-cost, efficient utilization.

Other objects not specifically set forth will become apparent from the following detailed description made in conjunction with the drawings wherein:

FIG. 1 is a longitudinal section of the refrigerant assembly of the present invention illustrating therein a pair of the new and improved drier cartridges also forming a part of the invention;

FIG. 2 is an exploded perspective illustrating the improved structural features and cooperative elements of the drier assembly and cartridge;

FIG. 3 is a transverse section of the drier assembly taken generally along line 3—3 in FIG. 1;

FIG. 4 is an enlarged fragmentary section of a portion of the discharge end of the drier assembly illustrating a self-sealing feature thereof; and FIG. 5 is a slightly enlarged longitudinal section of the new and improved drier cartridge of the present invention.

Referring in particular to FIG. 1, the refrigerant drier 10 of the present invention includes a housing which comprises a tubular shell 11 having an end cap 12 fixedly secured thereto at the discharge end thereof. Received centrally through the end cap 12 is a tubular discharge fitting 13 provided with a plurality of inwardly directed projections 14 which extend into the shell 11 for a purpose to be described. The discharge fitting 13 is adapted for connection with a refrigerant flow line in any suitable manner.

The opposite end of the shell 11 has secured thereto a flange ring 15 provided with a plurality of apertured flanges receiving therethrough capscrews 16 which are carried in suitable apertured flanges forming a part of a removable cover plate 17. The inner surface of the cover plate 17 is provided with a circumferential groove in which a gasket 18 is seated and brought into sealing engagement with the outer end face of the flange ring 15. Nuts 19 threadedly secure the cover plate 17 on the open end of the shell 11.

Axially inwardly of the cover plate 17, the shell 11 is provided with a suitable inlet fitting 20 which is fixedly secured within a collar-like saddle 21 fixed to the outer surface of the shell 11. The inlet fitting 20 is designed for suitable connection to a refrigerant flow line to deliver refrigerant to the shell 11, axially therealong, and out of the shell 11 through the outlet fitting 13 as indicated by the arrows.

As illustrated in FIG. 1, the shell 11 receives therein a pair of drier cartridges generally designated by the numeral 22. Each of these cartridges are tubular with its outer periphery spaced from the inner surface of the shell 11 for refrigerant flow from the outer periphery thereof and centrally axially therefrom to the outlet 13. This type of refrigerant flow is generally referred to as "parallel flow" as distinguished from "straight through" flow as refrigerant will surround each cartridge, flow at an angle inwardly toward the center of each cartridge, and be centrally collected in aligned cartridges for axial discharge flow therefrom. It has been found that this type of flow is of particular importance in controlling pressure drop within the confines of the pumping capacity in a given refrigeration system while permitting the use of any number of axially aligned drier cartridges. In other words, "parallel flow" of the type described permits the maintaining of a given pressure drop in a drier assembly regardless of the number of drier cartridges utilized therein. Consequently, the drying efficiency in a given refrigeration system may be substantially increased without increasing the pressure drop in the drier assembly. This constitutes an important feature as can readily be appreciated. Furthermore, the type of flow described permits full and equal utilization of all drier cartridges present in the assembly thus obviating the disadvantage of excessive clogging of the foremost cartridge.

In considering the type of "parallel flow" described above, it can further be appreciated that, in actuality, with an increase in the number of drier cartridges utilized in a given assembly, there is an accompanying decrease in total pressure drop providing total system refrigerant flow is maintained. Consequently, upon increasing the number of cartridges in the assembly, the total refrigerant flow can also be increased without increasing the overall pressure drop. This can be of particular importance in systems of rather substantial variable capacity.

It is to be understood that while FIG. 1 illustrates the use of two cartridges 22 and FIG. 2 merely illustrates a single cartridge 22, any number of cartridges may be utilized in the assembly depending upon the capacity of the assembly housing. Each cartridge 22 is preferably of the filter-drier type including an inner tubular screen 23 and an outer perforated tube or sleeve 24. By way of example, the inner screen 23 which is the outlet screen, may be formed from 100 mesh Monel material. The outer tube 24, which is the inlet screen, may be formed from perforated brass. Opposite ends of the telescoped screens 23 and 24 are enclosed by annular, imperforate end plates 25. Each end plate 25 is flanged along its inner and outer peripheries to provide for recessed seating between the inner and outer screens.

A dehydrant tube in the form of a porous molded desiccant block 26 is received about the inner screen 23 and extends between the end plates 25. The outer diameter of the block 26 is substantially less than the diameter of the outer screen 24 to define an annular area in which discrete dehydrant material 27 is packed.

Self-alignment of a series of the cartridges 22 within the shell 11 is accomplished by the provision of a plurality of channel-shaped spacers 28 suitably fixed to the outer surface of the outer screen 24. The spacers 28 may be of any suitable configuration to perform the function of establishing and maintaining the outer peripheral spacing between each cartridge and the inner surface of the shell 11 to provide for the "parallel flow" feature as well as functioning to provide axial self-alignment of adjacent cartridges when the same are introduced to the shell 11 through the cover plate opening.

Referring particularly to FIGS. 1 and 2, the assembly is completed at the outlet end with the provision of a safety cap 29 which is provided with a rearwardly directed annular sleeve extension 30 designed for being received about the adjacent end of a cartridge 22. The central portion of the cap 29 is flared and terminates in an axially directed flange 31 preferably dimensioned for frictional engagement with the inner surface of the shell 11. This frictional engagement functions to hold the cap 29 in the shell 11 during cartridge replacement and further prevents by-pass leakage of refrigerant flowing about the cartridges 22. A gasket 32 (FIGS. 1 and 4) is received and seated inwardly of the flange 31 for compressive sealing engagement with the inner surface of the end cap 12. This further prevents undesirable refrigerant by-pass around the cartridges 22. The safety cap 29 forms a permanent part of the assembly and carries centrally thereof a screen 33 which functions to retain in the drier assembly any foreign particles that might inadvertently occur therein. The projections 14 of the discharge fitting 13 function to provide support to the safety cap screen 33.

On the inlet side of the cartridges 22, the assembly includes a coil spring 34 which is of general cone configuration with the base thereof suitably seated on the inner surface of the cover plate 17. The opposite end of the spring 34 is of sufficient diameter to be received about the end projection of the inner screen 23 of a cartridge 22 within the inwardly offset recess of the adjacent end plate 25. The actual seat of the spring 34 is provided by a removable seal cap 35 which is imperforate, of dish shape, and is provided with a radially outwardly directed annular spring seat flange 36. The inner diameter of the seal cap 35 is sufficiently greater than the outer diameter of the projecting end of the inner screen 23 of the adjacent cartridge 22 to permit receiving therebetween an annular gasket 37 which is provided with a radially inwardly directed flange 38 extending over the edge of the inner screen 23 as shown in FIG. 1. Preferably, an imperforate tube closure disc in the form of an outlet cap 39 is received between the radial flange 38 of the gasket 37 and the edge of the inner screen 23. The diameter of the outlet cap 39 is at least equal to the outer diameter of the inner screen 23 to overlap the same to permit holding thereagainst by the gasket 37.

Each cartridge 22 is designed to be supplied as a separate unit for replacement purposes and with each cartridge the manufacturer will preferably supply one gasket 37. As illustrated in FIG. 1, the gasket 37 will be used for one of two purposes. The first purpose is to provide a seal between the seal cap 35 and the adjacent end of the inner screen 23. Another purpose is to provide a seal between adjacent aligned ends of inner screens 23 intermediate adjacent cartridges 22. The inwardly directed flange 38 of each gasket 37 establishes a seal between juxtaposed edges of inner screens 23 of adjacent cartridges 22, the sealing pressure being supplied by the spring 34. In this manner replacement cartridges may be used without differentiation either on the outlet side as viewed in FIG. 1 or on the inlet side in conjunction with the seal cap 35.

The outlet cap 39 is preferably used although it will be understood that the imperforate seal cap 35 is entirely capable of efficiently sealing off the adjacent end of the inner screen 23 in the presence of a gasket 37. However, during placement of the cover plate 17 on the assembly following charging of the same, inadvertent misalignment of the innermost end of the spring 34 and seal cap 35 may occur. In other words, the seal cap may not be brought into proper centered alignment with the projecting end of the inner screen 23 although such misalignment will still be capable of providing adequate sealing force to the axially positioned cartridges. In this event, the outlet cap 39 functions to close off the end of the inner screen 23 and prevent by-passing of the refrigerant.

From the foregoing it will be appreciated that the cartridges 22 are self-spacing, self-aligning and self-sealing. The procedure followed during recharging consists of the removal of the cover plate 17, removal of the exhausted cartridges 22, removal of new cartridges from their moisture-proof containers, immediately placing of each new cartridge into the shell 11 without concern with respect to alignment, spacing or sealing, and immediate replacement of the cover plate 17. This constitutes, in effect, "split second" charging. The new cartridges are not exposed to moisture laden atmosphere conditions for any appreciable time to result in loss of efficiency and capacity.

Referring particularly to FIG. 5, a slight modification is illustrated with reference to the cartridge 40. Like reference numerals are used in FIG. 5 to identify elements which are similar to those described in connection with the cartridge 22. As previously referred to, it is preferred that each cartridge include a porous molded desiccant block 26 which not only provides efficient drying action but also functions to filter the refrigerant during passage therethrough. In molding blocks of this type, it is necessary to provide the central core 41 thereof with a slight taper in order to permit ready withdrawal of the core forming element. This taper of the core 41 is slightly exaggerated in FIG. 5 to better illustrate the feature to be described. With the presence of this taper, the block 26 is not fully seated on the inner screen 23. Allowing for manufacturing tolerances, there will be a certain amount of play between the block and inner screen resulting in possible rocking of the block relative to the screen and possible refrigerant leakage around the ends of the block and directly into the center of the cartridge.

In order to minimize leakage it is possible to insert annular gaskets 42 at each end of the block 26 in compressive engagement with the inner surfaces of the end plates 25. Even with the provision of these end gaskets 42, there is still the possibility of play or rocking of the block 26 relative to the screen 23 in response to pressure surges which may result in a degree of refrigerant by-pass. To completely eliminate block play and provide efficient gasket sealing at the ends thereof, the discrete particles of desiccant material 27 are tightly packed about the outer periphery of the block 26 between the same and the outer screen 24. Consequently, the provision of the discrete desiccant particles 27 provides for block centering and supporting while additionally functioning to remove moisture from the refrigerant flowing in contact therewith. This fixing and supporting function of the desiccant particles eliminates the possibility of refrigerant by-pass around the ends of the block 26. Thus, a practical solution to eliminate costly tolerance molding requirements is provided by the combination of the various elements of the improved drier cartridge.

Obviously certain modifications and variations of the invention as hereinbefore set forth may be made without departing from the spirit and scope thereof, and therefore only such limitations should be imposed as are indicated in the appended claims.

I claim:

1. A refrigerant filter-drier cartirdge for use in a refrigerant drier assembly, said cartridge including an inner screen-like tube having imperforate end plates fixed about the ends thereof, an outer screen-like tube circumferentially enclosing said inner tube and end plates, a porous dehydrant tube mounted on said inner tube, and discrete dehydrant material packed intermediate said dehydrant tube and outer tube, said dehydrant material holding said dehydrant tube relative to said inner tube in sealed engagement with said end plates to prevent refrigerant by-pass between the end surfaces of said dehydrant tube and said end plates, said inner tube projecting outwardly of the ends of said cartridge and carrying thereabout on at least one projecting end thereof a gasket provided with a radially inwardly directed flange the inner surface of which is in resilient sealing engagement with outer end surface portions of said inner tube.

2. A refrigerant filter-drier cartridge for use in a refrigerant drier assembly, said cartridge including an inner screen-like tube having imperforate end plates fixed about the ends thereof, an outer screen-like tube circumferentially enclosing said inner tube and end plates, a molded porous dehydrant tube mounted on said inner tube, and discrete dehydrant material packed intermediate said dehydrant tube and outer tube, end gaskets received about said inner tube intermediate the ends of said dehydrant tube and said end plates, said dehydrant material holding said dehydrant tube relative to said inner tube to maintain sealing engagement of the end surfaces of said tube with said end gaskets and said end plates to prevent with the aid of said end gaskets refrigerant by-pass between the end surfaces of said dehydrant tube and said end plates.

3. A refrigerant filter-drier cartridge for use in a refrigerant drier assembly, said cartridge including an inner screen-like tube having imperforate end plates fixed about the ends thereof, an outer screen-like tube circumferentially enclosing said inner tube and end plates, a molded porous dehydrant tube mounted on said inner tube, and discrete dehydrant material packed intermediate said dehydrant tube and outer tube, end gaskets received about said inner tube intermediate the ends of said dehydrant tube and said end plates, said dehydrant material holding said dehydrant tube relative to said inner tube to maintain sealing engagement of the end surfaces of said tube with said end gaskets and said end plates to prevent with the aid of said end gaskets refrigerant by-pass between the end surfaces of said dehydrant tube and said end plates, said inner tube projecting outwardly of the ends of said cartridge and carrying thereabout on at least one projecting end thereof a gasket provided with a radially inwardly directed flange the inner surface of which is in resilient sealing engagement with outer end surface portions of said inner tube.

4. A refrigerant drier comprising a shell having refrigerant flow inlet and outlet means, a drier cartridge in said shell between said inlet and outlet means, said cartridge including an inner screen-like tube having imperforate end plates fixed about the ends thereof and an outer screen-like tube circumferentially enclosing said inner tube and end plates, dehydrant material received between said tubes and end plates, said cartridge having an outer diameter which is less than the inner diameter of said shell to provide for refrigerant flow from the outer periphery thereof into said inner tube and axially therefrom into said outlet means, and spring means in said shell seated at one end adjacent said inlet means and including a movable seat at the other end thereof in closing relation with the adjacent end of the inner tube of said cartridge to establish said refrigerant flow and prevent refrigerant flow by-pass centrally through said cartridge, the end of the inner tube of said cartridge closed by said movable seat projecting beyond its associated end plate and carrying thereabout a gasket provided with a radially inwardly directed flange which holds an imperforate tube closure disc against the end surface of said inner tube, said movable seat engaging said gasket.

5. A refrigerant drier comprising a shell having refrigerant flow inlet and outlet means, a plurality of drier cartridges in said shell in sealed end-to-end relation between said inlet and outlet means, each of said cartridges including an inner screen-like tube having imperforate end plates fixed about the ends thereof and an outer screen-like tube circumferentially enclosing said inner tube and said end plates, dehydrant material received between said tubes and end plates, said cartridges each having an outer diameter which is less than the inner diameter of said shell to provide for refrigerant flow from the outer periphery thereof into said inner tube and axially therefrom into said outlet means, spring means in said shell seated at one end adjacent said inlet means and including a movable seat at the other end thereof in closing relation with the adjacent end of the inner tube of the adjacent cartridge to establish said refrigerant flow and prevent refrigerant flow by-pass centrally through said cartridges, adjacent ends of the inner tubes of adjacent cartridges being in sealed communication by gasket means carried by one of said ends, and a safety cap telescopically removably received on the end of said cartridge adjacent said outlet means in sealed relation with said cartridge, said cap including a radial screen-like portion permitting refrigerant flow from the inner tube of said adjacent cartridge into said outlet means, said cap further including imperforate radially extending shell engaging means sealing off the space between said adjacent cartridge and shell to prevent refrigerant flow by-pass through said shell directly to said outlet means, said shell engaging means carrying gasket means in resilient sealing engagement with said shell, the end of the inner tube of said cartridge closed by said movable seat projecting beyond its associated end plate and carrying thereabout a gasket provided with a radially inwardly directed flange which holds an imperforate tube closure disc against the end surface of said inner tube, said movable seat engaging said gasket.

References Cited in the file of this patent

UNITED STATES PATENTS

| | | |
|---|---|---|
| 143,676 | Demailly | Oct. 14, 1873 |
| 2,199,258 | Gray | Apr. 30, 1940 |
| 2,304,618 | Williams | Dec. 8, 1942 |
| 2,313,307 | Wilkinson | Mar. 9, 1943 |
| 2,556,292 | Newcum | June 12, 1951 |
| 2,568,181 | Zimmerman et al. | Sept. 18, 1951 |
| 2,623,607 | Battum | Dec. 30, 1952 |
| 2,736,457 | Hurley | Feb. 28, 1956 |
| 2,797,022 | Kettleborough | June 25, 1957 |
| 2,873,856 | Jones | Feb. 17, 1959 |
| 2,966,269 | Allen | Dec. 27, 1960 |